United States Patent
Kim et al.

(10) Patent No.: US 11,653,805 B2
(45) Date of Patent: May 23, 2023

(54) ROBOT CLEANER FOR PERFORMING CLEANING USING ARTIFICIAL INTELLIGENCE AND METHOD OF OPERATING THE SAME

(71) Applicant: LG ELECTRONICS INC., Seoul (KR)

(72) Inventors: Jaehong Kim, Seoul (KR); Hyoeun Kim, Seoul (KR); Heeyeon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 835 days.

(21) Appl. No.: 16/575,628

(22) Filed: Sep. 19, 2019

(65) Prior Publication Data

US 2020/0012289 A1    Jan. 9, 2020

(30) Foreign Application Priority Data

Aug. 14, 2019    (KR) .................. 10-2019-0099907

(51) Int. Cl.
*A47L 9/28*    (2006.01)
(52) U.S. Cl.
CPC ........... *A47L 9/2831* (2013.01); *A47L 9/2826* (2013.01); *G05D 2201/0215* (2013.01)
(58) Field of Classification Search
CPC .... A47L 9/2831; A47L 9/2826; A47L 9/2805; A47L 9/281; A47L 9/2842; A47L 9/2852; A47L 2201/04; A47L 2201/06; G05D 2201/0215; G05D 2201/0203; G05D 1/0246; G05D 1/0221; G06N 3/006;
(Continued)

(56) References Cited

U.S. PATENT DOCUMENTS

2013/0096717 A1*  4/2013  Yoon ................... A47L 11/4061
                                                   700/245
2017/0205822 A1*  7/2017  Shin ...................... G05D 1/0016
2017/0243135 A1*  8/2017  Ooba .................. G05B 13/0265
(Continued)

FOREIGN PATENT DOCUMENTS

JP    H04-263816        9/1992
KR    10-2019-0092338   8/2019
KR    10-2019-0093529   8/2019

OTHER PUBLICATIONS

Korean Office Action dated Nov. 25, 2020 issued in Application No. 10-2019-0099907.

*Primary Examiner* — Khoi H Tran
*Assistant Examiner* — Nhi Q Bui
(74) *Attorney, Agent, or Firm* — KED & Associates LLP

(57) ABSTRACT

A robot cleaner for performing cleaning using artificial intelligence includes a suction unit configured to suction dust, a driving unit to drive the robot cleaner, a memory configured to store a compensation model for inferring optimal suction output and driving output for cleaning environment information for learning, and a processor configured to acquire cleaning environment information, determine a suction output value and a driving speed of the robot cleaner from the acquired cleaning environment information using the compensation model, control the suction unit to suction the dust with the determined suction output value, and control the driving unit to drive the robot cleaner at the determined driving speed.

16 Claims, 8 Drawing Sheets

(58) Field of Classification Search
CPC .......... G06N 3/08; G06N 7/005; G06N 20/00; B25J 9/1674; B25J 11/0085; B25J 19/02
See application file for complete search history.

(56) References Cited

U.S. PATENT DOCUMENTS

| | | |
|---|---|---|
| 2018/0026573 A1* | 1/2018 | Akashi ..................... G06N 3/02 318/6 |
| 2018/0255997 A1* | 9/2018 | So .......................... B25J 9/1664 |
| 2019/0094870 A1* | 3/2019 | Afrouzi ................ G05D 1/0274 |
| 2019/0204851 A1* | 7/2019 | Afrouzi ................. A47L 9/2852 |
| 2019/0343355 A1* | 11/2019 | Han ..................... A47L 9/2842 |
| 2019/0369628 A1 | 12/2019 | Kim et al. |

* cited by examiner

FIG. 8
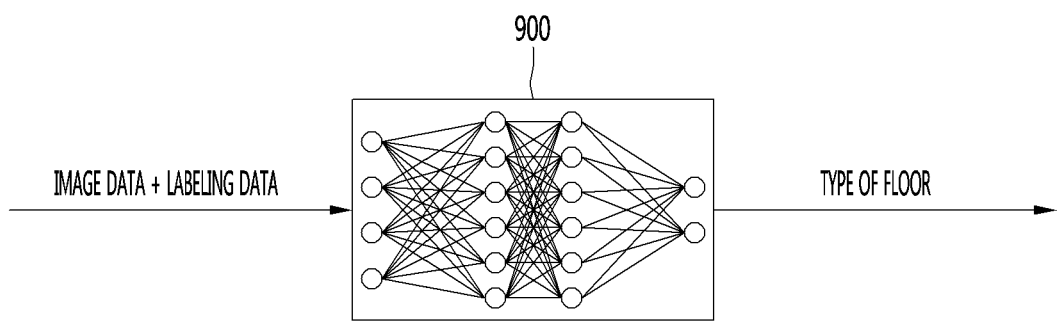
| FLOOR TYPE | CARPET | BARE FLOOR | DECORATION TILE |
|---|---|---|---|
| DRIVING OUTPUT COMPARED TO DRIVING SPEED | 10 | 30 | 20 |
FIG. 9
FIG. 10
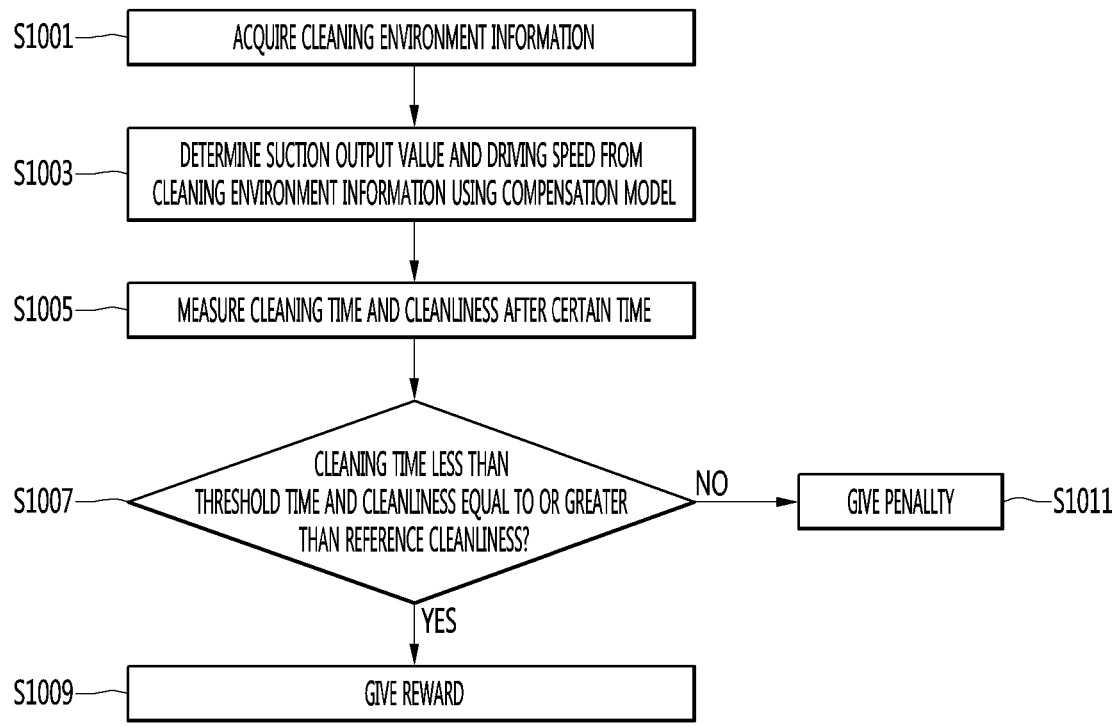

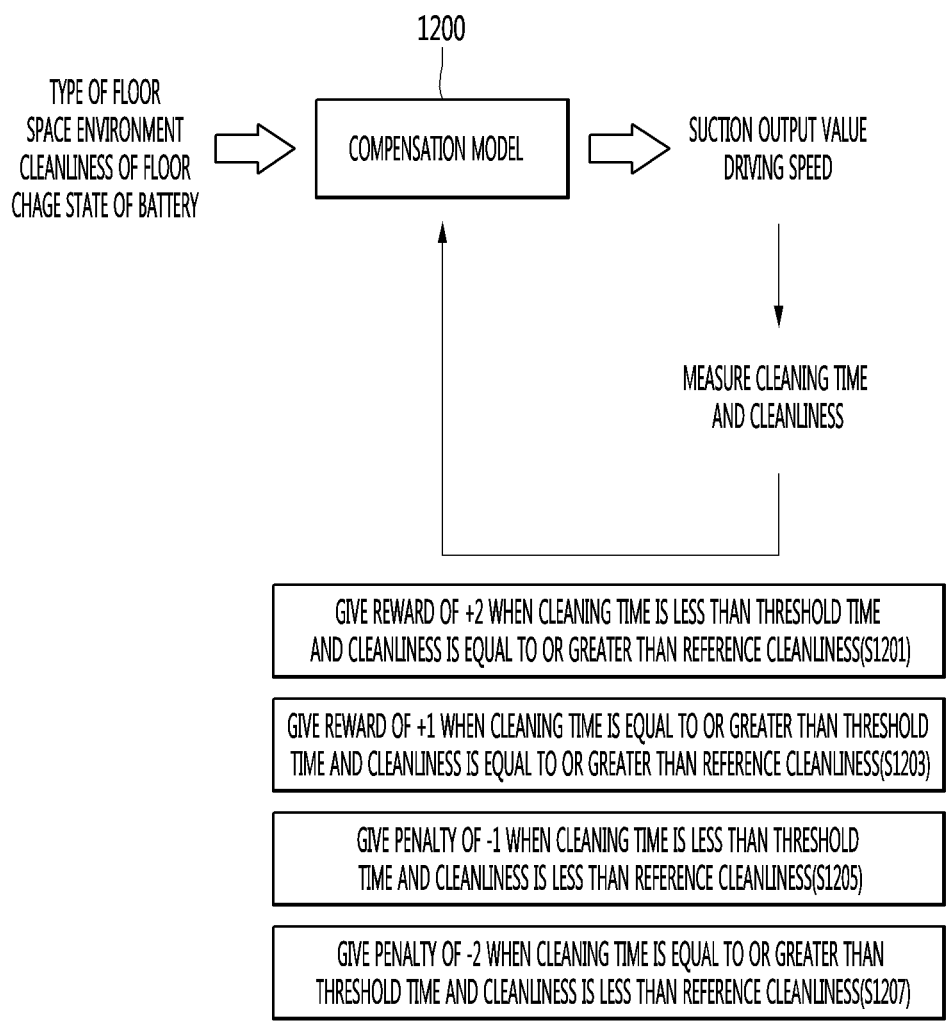

ROBOT CLEANER FOR PERFORMING CLEANING USING ARTIFICIAL INTELLIGENCE AND METHOD OF OPERATING THE SAME

CROSS-REFERENCE TO RELATED APPLICATIONS

This application claims priority to Korean Patent Application No. 10-2019-0099907, filed on Aug. 14, 2019 in Korea, the entire contents of which is hereby incorporated by reference in its entirety.

BACKGROUND

The present disclosure relates to a robot cleaner for performing cleaning using artificial intelligence (AI).

A robot cleaner is an AI device to self-drive in an area to be cleaned without an operation of a user to suction foreign substances, such as dust, from the floor, thereby automatically performing cleaning.

Such a robot cleaner sets a cleaning path by recognizing the structure of a space and performs a cleaning operation along the set cleaning path. In addition, the robot cleaner performs cleaning according to a preset schedule or a user command.

A conventional robot cleaner may control output of a motor based on a specific situation, for example presence/absence of a carpet, presence/absence of a corner or presence/absence of dust on the floor.

A cleaning mode according to the output of the motor includes a normal mode and a turbo mode having larger output. However, various cleaning situations cannot be considered.

SUMMARY

The present disclosure is to provide a robot cleaner capable of performing suitable dust suction and traveling at a suitable speed in consideration of various cleaning environments.

The present disclosure is to provide a robot cleaner capable of performing cleaning suitable for a cleaning environment using a reinforcement learning model.

A robot cleaner for performing cleaning according to an embodiment of the present disclosure may acquire cleaning environment information and determine a suction output value and a driving speed of the robot cleaner from the acquired cleaning environment information using a compensation model learned through a deep learning algorithm or a machine learning algorithm.

The robot cleaner according to the embodiment of the present invention may control operation of the robot cleaner with an optimal suction output value and driving speed value using an artificial neural network based compensation model subjected to reinforcement learning.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 8 is a view illustrating an example of a look-up table according to an embodiment of the present invention.

FIG. 9 is a view illustrating a process of training an image recognition model according to an embodiment of the present invention.

FIGS. 10 to 12 are views illustrating a method of training a compensation model according to an embodiment of the present invention.

DETAILED DESCRIPTION OF THE EMBODIMENTS

Figure 1:
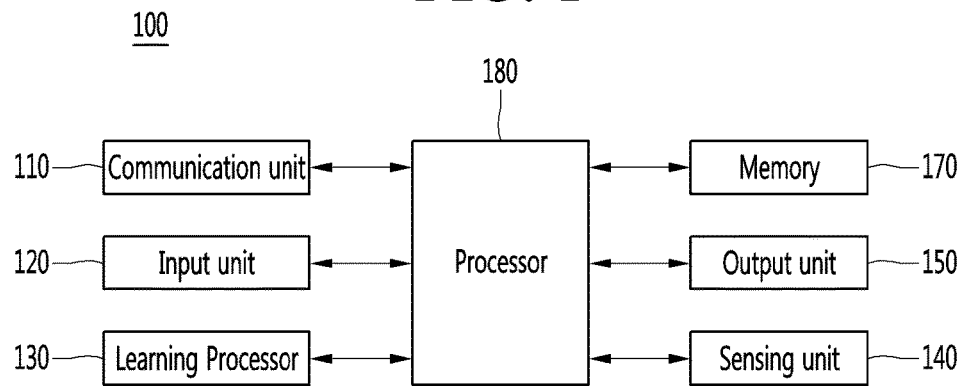
FIG. 1 illustrates an AI device 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
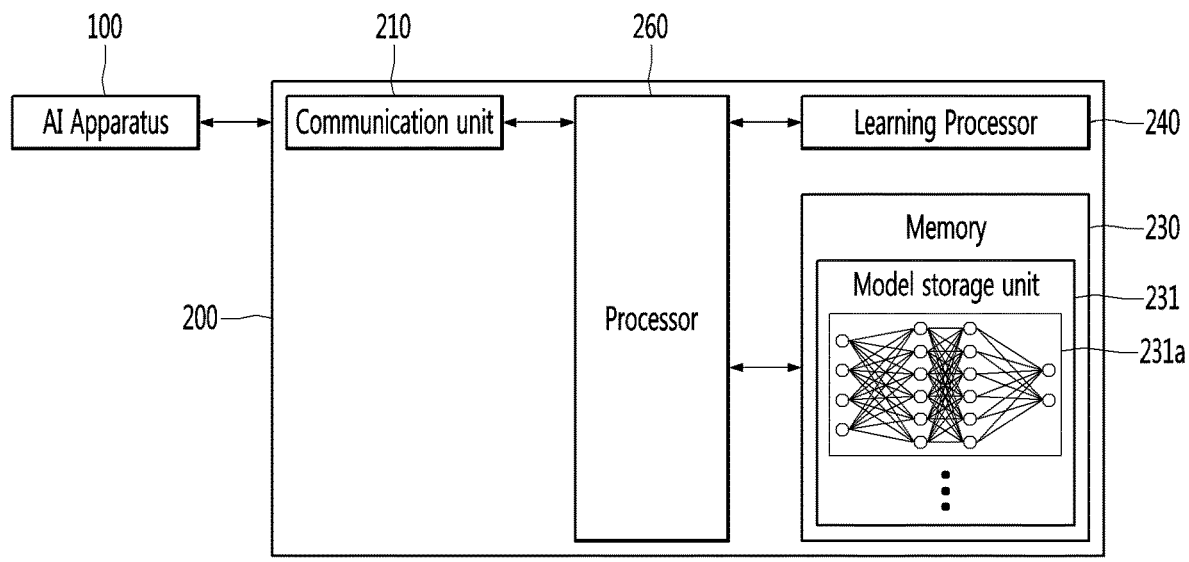
FIG. 2 illustrates an AI server 200 according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
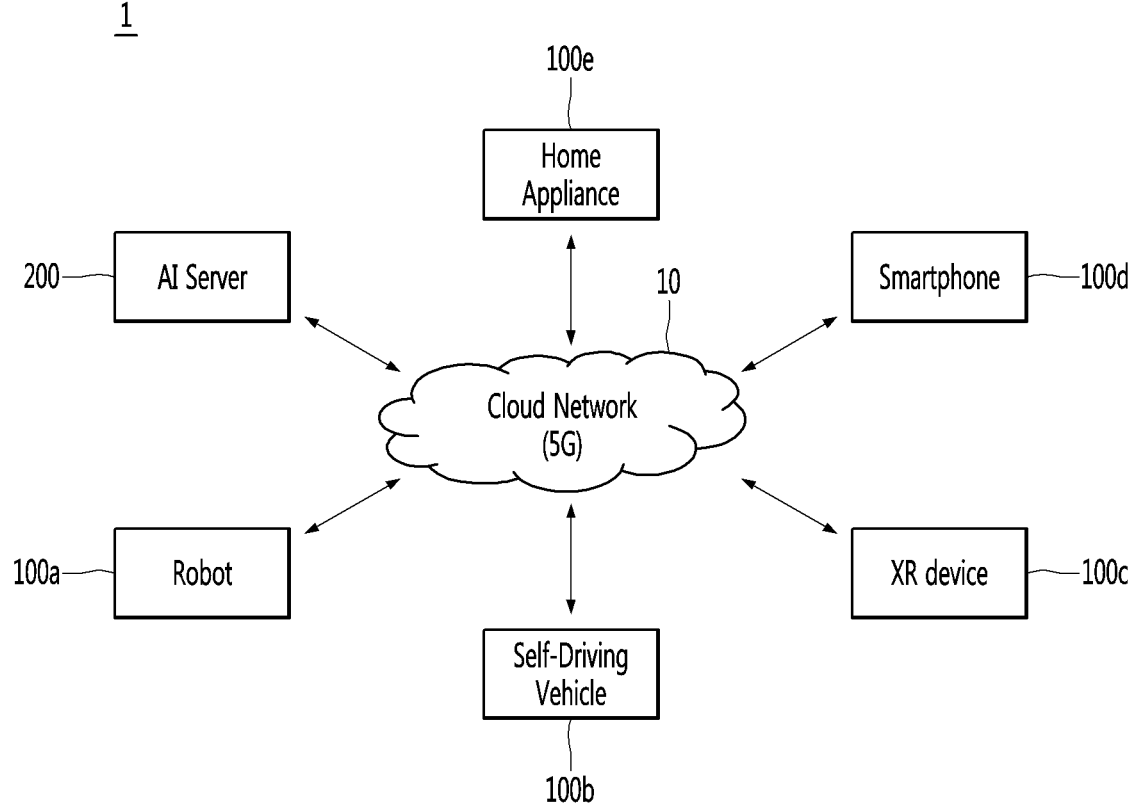
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
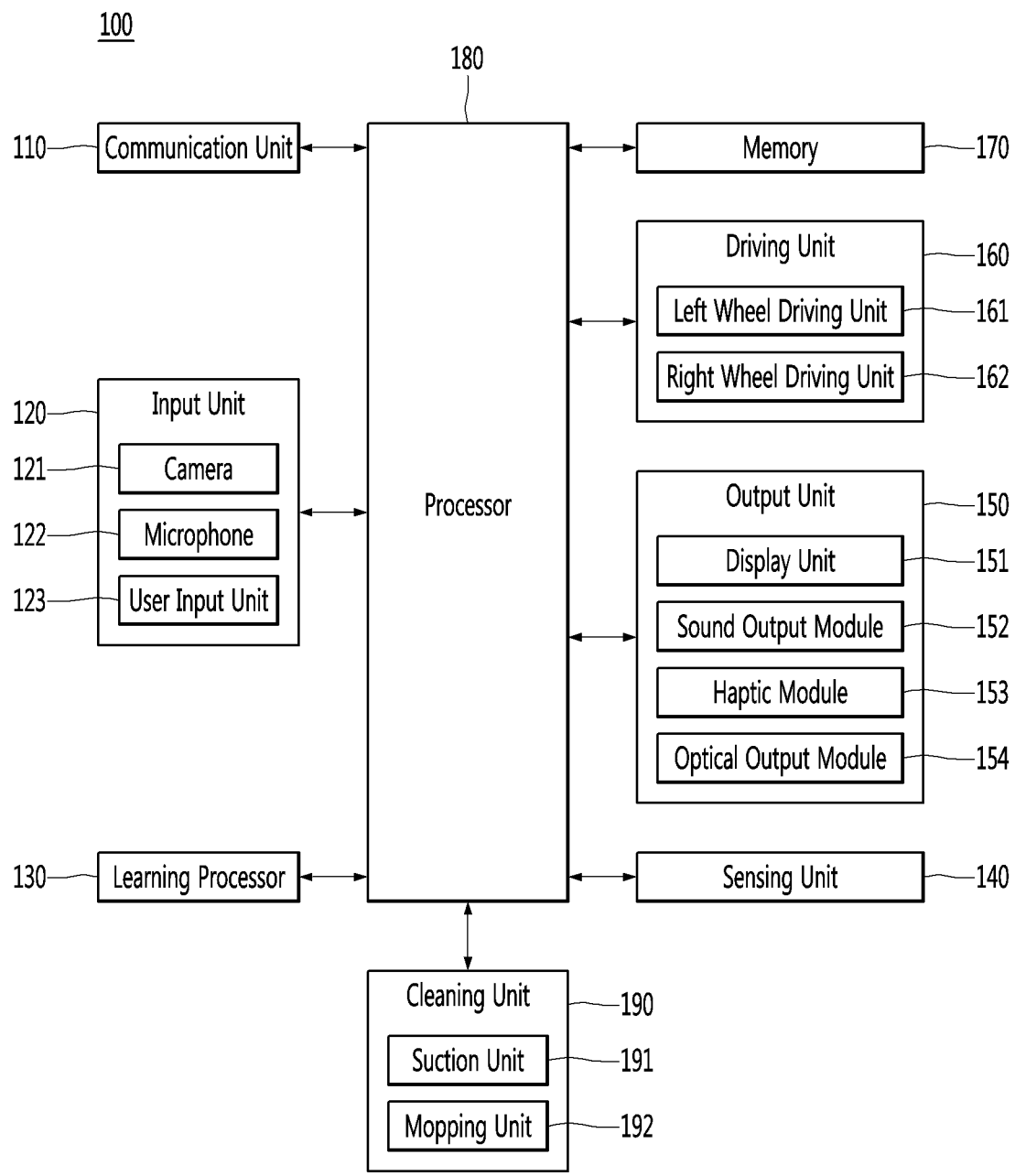
FIG. 4 illustrates an AI device 100 according to an embodiment of the present invention.

FIG. 4 illustrates an AI device 100 according to an embodiment of the present invention.

The redundant repeat of FIG. 1 will be omitted below.

Referring to FIG. 4, the AI device 100 may further include a driving unit 160 and a cleaning unit 190.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The sensing unit 140 may be called a sensor unit.

The sensing unit 140 may include at least one of a depth sensor (not illustrated) or an RGB sensor (not illustrated) to acquire image data for a surrounding of the AI robot 100.

The depth sensor may sense that light irradiated from the light emitting unit (not illustrated) is reflected and return. The depth sensor may measure the difference between times at which the returning light is transmitted, an amount of the returning light, and a distance from an object.

The depth sensor may acquire information on a two dimensional image or a three dimensional image of the surrounding of the AI robot 100, based on the distance from the object.

The RGB sensor may obtain information on a color image for an object or a user around the AI robot 100. The information on the color image may be an image obtained by photographing an object. The RGB sensor may be named an RGB camera.

In this case, the camera 121 may refer to the RGB sensor.

The output unit 150 may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The driving unit 160 may move the AI robot 100 in a specific direction or by a certain distance.

The driving unit 160 may include a left wheel driving unit 161 to drive the left wheel of the AI robot 100 and a right wheel driving unit 162 to drive the right wheel.

The left wheel driving unit 161 may include a motor for driving the left wheel, and the right wheel driving unit 162 may include a motor for driving the right wheel.

Although the driving unit 160 includes the left wheel driving unit 161 and the right wheel driving unit 162 by way of example as in FIG. 4, but the present invention is not limited thereto. In other words, according to an embodiment, the driving unit 160 may include only one wheel.

The cleaning unit 190 may include at least one of a suction unit 191 or a mopping unit 192 to clean the floor around the AI device 100.

The suction unit 191 may be referred to as a vacuum cleaning unit.

The suction unit 191 may suction air to suction foreign matters such as dust and garbage around the AI device 100.

In this case, the suction unit 191 may include a brush or the like to collect foreign matters.

The mopping unit 192 may wipe the floor in the state that a mop is at least partially in contact with the bottom surface of the AI device 100.

In this case, the mopping unit 192 may include a mop and a mop driving unit to move the mop In this case, the mopping unit 192 may adjust the distance from the ground surface through the mop driving unit. In other words, the mop driving unit may operate such that the mop makes contact with the ground surface when the mopping is necessary.

Figure 5:
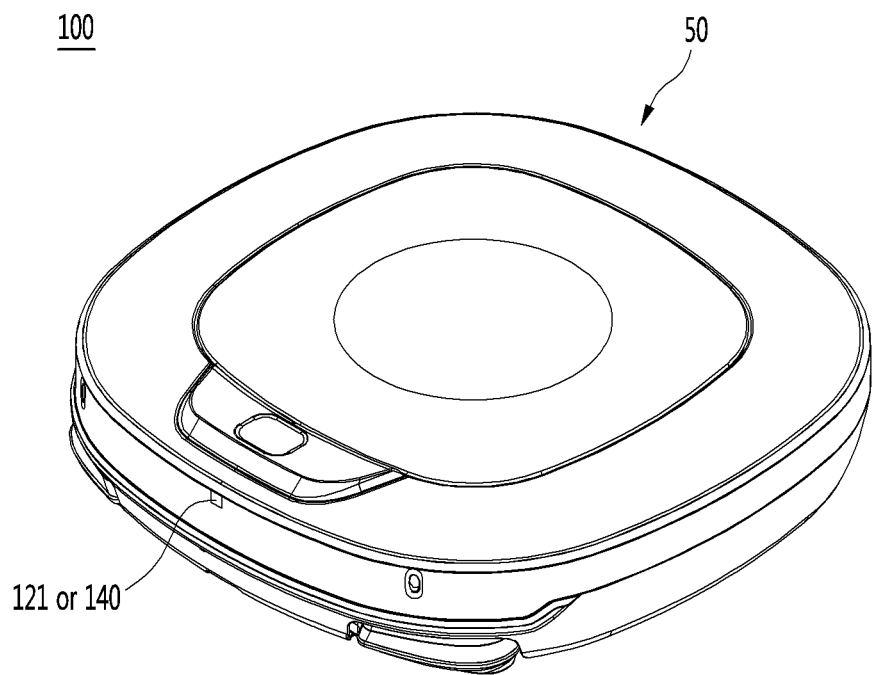
FIG. 5 a perspective view of an AI device 100 according to an embodiment of the present invention.

FIG. 5 a perspective view of the AI device 100 according to an embodiment of the present invention.

Referring to FIG. 5, the AI robot 100 may include a cleaner body 50 and a camera 121 or a sensing unit 140.

The camera 121 or the sensing unit 140 may irradiate a light forward and receive the reflected light.

The camera 121 or the sensing unit 140 may acquire the depth information using the difference between times at which the received lights are returned.

The cleaner body 50 may include remaining components except the camera 121 and the sensing unit 140 described with reference to FIG. 4.

Figure 6:
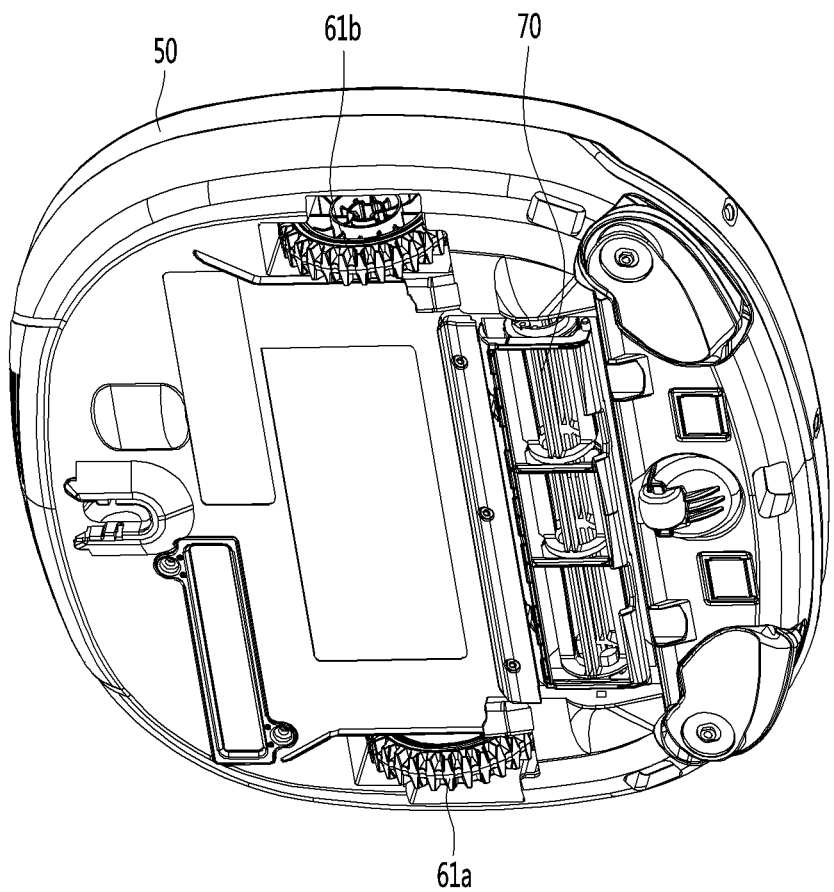
FIG. 6 a bottom view of an AI device 100 according to an embodiment of the present invention.

FIG. 6 is a bottom view of the AI device 100 according to an embodiment of the present invention.

Referring to 6, the AI device 100 may further include a cleaner body 50, a left wheel 61a, a right wheel 61b, and a suction unit 70 in addition to the components of FIG. 4.

The left wheel 61a and the right wheel 61b may allow the cleaner body 50 to travel.

The left wheel driving unit 161 may drive the left wheel 61a and the right wheel driving unit 162 may drive the right wheel 61b.

As the left wheel 61a and the right wheel 61b are rotated by the driving unit 160, the AI robot 100 may suction foreign matters such as dust and garbage through the suction unit 70.

The suction unit 70 is provided in the cleaner body 50 to suction dust on the floor surface.

The suction unit 70 may further include a filter (not illustrate) to collect foreign matters from the sucked air stream and a foreign matter receiver (not illustrated) to accumulate foreign matters collected through the filter.

In addition to the components of FIG. 4, the AI robot 100 may further include a mopping unit (not illustrated).

The mopping unit (not illustrated) may include a damp cloth (not illustrated) and a motor (not illustrated) to rotate the damp cloth in contact with the floor and to move the damp cloth along a set pattern.

The AI device 100 may wipe the floor with the mopping unit (not illustrated).

Figure 7:
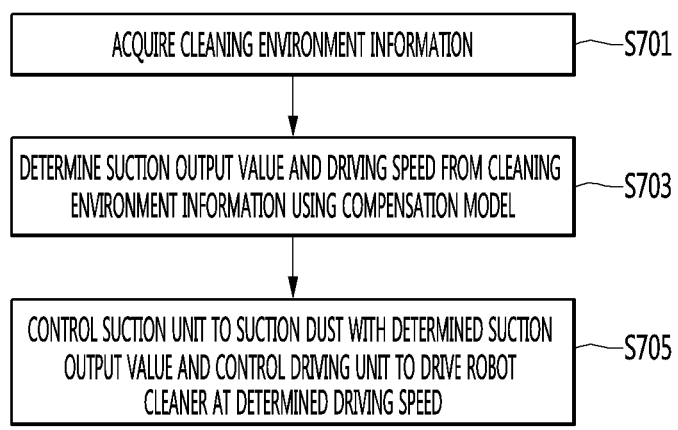
FIG. 7 is a flowchart illustrating a method of operating an AI device for performing cleaning in consideration of the state of the floor according to an embodiment of the present invention.

FIG. 7 is a flowchart illustrating a method of operating an AI device for performing cleaning in consideration of the state of the floor according to an embodiment of the present invention.

Hereinafter, the AI device 100 will be referred to as a robot cleaner.

The processor 180 of the robot cleaner 100 acquires cleaning environment information (S701).

In one embodiment, the cleaning environment information may include one or more of floor environment state information, space environment information, floor cleanliness state information or battery charge state information.

The floor environment state information may indicate the type of the floor. That is, the floor environment state information may indicate whether the floor is a carpet, a bare floor or a decoration tile, that is, the type of the floor.

The processor 180 may determine the type of the floor based on the driving speed of the robot cleaner 100 compared to the driving output of the driving unit 160.

The driving output may be any one of a voltage value or a current value applied to the motor.

The processor 180 may determine the type of the floor using a look-up table stored in the memory 170. The look-up table may show a correspondence relation between the type of the floor and the driving speed compared to the driving output.

This will be described with reference to FIG. 8.

FIG. 8 is a view illustrating an example of a look-up table according to an embodiment of the present invention.

Referring to FIG. 8, a look-up table 800 showing a correspondence relation between the type of the floor and the driving speed compared to the driving output is shown.

When the driving output is the same, the driving speed of the robot cleaner 100 may vary according to the type of the floor.

For example, the driving speed may be 10 when the type of the floor is a carpet, may be 30 when the type of the floor is a bare floor, and may be 20 when the type of the floor is a decoration tile.

In one embodiment, a plurality of look-up tables may be provided according to the value of the driving output.

The processor 180 may measure the driving speed compared to the driving output using the look-up table 800 and determine the type of the floor corresponding to the measured driving speed.

FIG. 7 will be described again.

The processor 180 may determine a floor environment state using an image recognition model.

The image recognition model may be an artificial neural network based model subjected to supervised learning using a deep learning algorithm or a machine learning algorithm.

The image recognition model may determine the type of the floor from image data.

The image recognition model may be learned by the learning processor 130 of the robot cleaner 100 and stored in the memory 170.

In another example, the image recognition model may be learned by the learning processor 240 of the AI server 200 and transmitted to the robot cleaner 100.

This will be described with reference to FIG. 9.

FIG. 9 is a view illustrating a process of training an image recognition model according to an embodiment of the present invention.

The image recognition model 900 may be learned through supervised learning.

A training data set used for learning of the image recognition model 900 may include image data and labeling data as correct answer data labeled therein.

The labeling data may be correct answer data indicating the type of the floor.

When an input feature vector is extracted from the image data and input to the image recognition model 900, a target feature vector may be output as a result of inferring the type of the floor.

The image recognition model 900 may be learned to minimize a cost function corresponding to a difference between the result of inferring the type of the floor and the labeling data.

FIG. 7 will be described again.

The space environment information may indicate the environment of a space to be cleaned. For example, the space environment information may indicate whether a space to be cleaned is a corner, under a desk or under a chair, that is, the environment of the space to be cleaned.

The space environment information may indicate whether there is a course where cleaning is difficult.

The space environment information may be confirmed based on the image data captured through the camera 121 provided in the robot cleaner 100.

The cleanliness state information of the floor may include cleanliness of the floor. The cleanliness of the floor may be measured through a dust sensor (not shown).

The cleanliness of the floor may decrease as the dust concentration value measured through the dust sensor increases and increases as the dust concentration value decreases.

The charge state information of the battery may indicate the charge state of the battery provided in the robot cleaner 100. That is, the charge state information of the battery may include one or more of the charge amount or discharge amount of the battery provided in the robot cleaner 100.

The processor 180 of the robot cleaner 100 may determine the suction output value of the suction unit 191 and the driving speed of the robot cleaner 100 from the cleaning environment information using a compensation model (S703).

In one embodiment, the compensation model may be an artificial neural network based model subjected to reinforcement learning by a deep learning algorithm or a machine learning algorithm.

The compensation model may be subjected to reinforcement learning by the learning processor 130 of the robot cleaner 100 or the learning processor 240 of the AI server 200.

The compensation model may infer optimal suction output and driving output from the cleaning environment information for learning.

The processor 180 may determine the suction output value of the suction unit 191 and the driving speed of the robot cleaner 100 from the cleaning environment information using a previously learned compensation model.

The process of training the compensation model will be described with reference to FIGS. 10 and 11.

Figure 11:
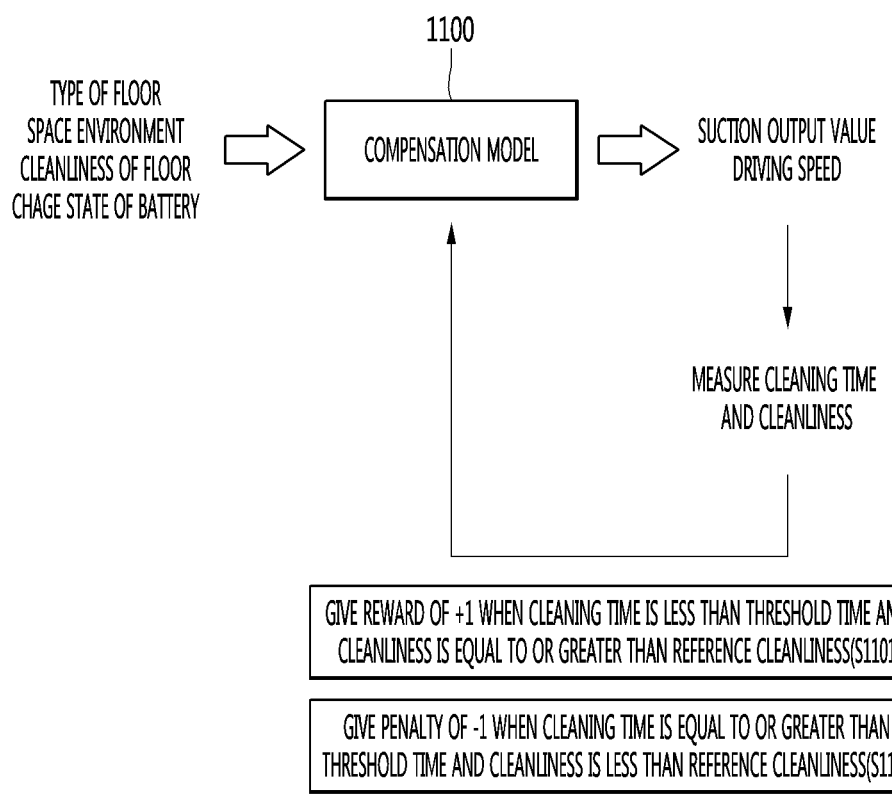

FIGS. 10 to 12 are views illustrating a method of training a compensation model according to an embodiment of the present invention.

Hereinafter, assume that the method of training the compensation model is performed by the learning processor 130 of the robot cleaner 100, but this is merely an example. The method may be performed by the learning processor 240 of the AI server 200.

The learning processor 130 of the robot cleaner 100 acquires cleaning environment information (S1001).

The cleaning environment information may include the type of the floor, the environment of the space to be cleaned, the cleanliness of the floor and the charge state of the battery, as shown in FIG. 11.

The learning processor 130 of the robot cleaner 100 determines the suction output value and the driving speed from the cleaning environment information using the compensation model 1100 (S1003).

The compensation model may be an artificial neural network based model learned through reinforcement learning.

The learning processor 130 of the robot cleaner 100 measures a cleaning time and cleanliness of a specific area of the robot cleaner 100 after a certain time (S1005).

The learning processor 130 may measure the cleaning time in order to determine whether the battery provided in the robot cleaner 100 is efficiently managed.

That is, it may be determined that the battery is efficiently managed as the cleaning time decreases and the battery is not efficiently managed as the cleaning time increases.

The cleaning time may be calculated through a difference between a cleaning start time point and a cleaning end time point of the robot cleaner 100 in a specific area.

In another example, the cleaning time may be replaced with power consumed for the robot cleaner 100 to clean the specific area.

In another example, the cleaning time may be replaced with the amount of battery consumed for the robot cleaner 100 to clean the specific area.

Cleanliness may be a dust concentration on the floor measured through the dust sensor in order to determine the cleaning performance of the robot cleaner 100.

First, an average value of the dust concentrations of a plurality of unit areas included in the specific area may be measured. Cleanliness may be calculated by (1−the average value of the dust concentrations).

The learning processor 130 of the robot cleaner 100 determines whether the cleaning time is less than a threshold time and cleanliness is equal to or greater than reference cleanliness (S1007).

The learning processor 130 of the robot cleaner 100 gives a reward to the compensation model 1100 when the cleaning time is less than the threshold time and the cleanliness is equal to or greater than the reference cleanliness (S1009).

The learning processor 130 of the robot cleaner 100 gives a penalty to the compensation model 1100 when the cleaning time is equal to or greater than the threshold time and the cleanliness is less than the reference cleanliness (S1011).

Reinforcement learning may be mainly performed by a Markov Decision process (MDP).

In the MDP, first, an environment including information necessary for the agent to take a next action is given.

Second, what action is taken by the agent in that environment is defined.

Third, a reward given to the agent when the agent successfully takes a certain action and a penalty given to the agent when the agent fails to take a certain action are defined.

Fourth, experience is repeated until a future reward reaches a maximum point, thereby deriving an optimal action policy.

When the MDP is applied to the present invention, the agent may be the robot cleaner 100 or the compensation model.

First, in the present invention, cleaning environment information which is an environment including information necessary for the compensation models 1100 and 1200 shown in FIGS. 11 and 12 to take next action may be given.

Second, in the present invention, what action is taken by the compensation models 1100 and 1200 based on the given environment may be defined, that is, the suction output value and the driving speed of the robot cleaner 100 may be determined.

Third, according to the suction output value and the driving speed of the robot cleaner determined by the compensation models 1100 and 1200, when the measured cleaning time is less than a threshold time and cleanliness is equal to or greater than reference cleanliness after cleaning a specific area, a reward may be given and, if not, a penalty may be given.

That is, as shown in FIG. 11, when the measured cleaning time is less than the threshold time and cleanliness is equal to or greater than the reference cleanliness, a reward of +1 may be given to the compensation model 1100 and, if not, a penalty of −1 may be given to the compensation model 1100 (S1103).

In another example, as shown in FIG. 12, the reward and the penalty may be further specified.

That is, as shown in FIG. 12, when the cleaning time is less than the threshold time and the cleanliness is equal to or greater than the reference cleanliness, a reward of +2 may be given to the compensation model 1200 (S1201). In addition, when the cleaning time is equal to or greater than the threshold time and the cleanliness is equal to or greater than the reference cleanliness, a reward of +1 may be given to the compensation model 1200 (S1203). When the cleaning time is less than the threshold time and the cleanliness is less than the reference cleanliness, a penalty of −1 may be given to the compensation model 1200 (S1205).

When the cleaning time is equal to or greater than the threshold time and the cleanliness is less than the reference cleanliness, a penalty of −2 may be given to the compensation model 1200 (S1207).

Fourth, the compensation models 1100 and 1200 may be repeatedly learned until a future reward reaches a maximum point, thereby deriving an optimal policy, that is, minimizing the cleaning time and acquiring the suction output value and the driving speed for maximizing cleanliness.

The parameters of the compensation models 1100 and 1200 including the artificial neural network may be updated using feedback.

In addition, as the artificial neural network is trained, the acquired learning result may be stored in the memory 170, using actions of the compensation models 1100 and 1200 and feedback according to action.

The learning result may mean the parameters of the compensation models 1100 and 1200 updated using feedback such as the cleaning time and the cleanliness. The learning result may configure a portion of the artificial neural network configuring the compensation models 1100 and 1200.

In another example, the compensation models 1100 and 1200 may be generated by training the artificial neural network in the AI server 200. When training is completed, the compensation models 1100 and 1200 may be installed in the robot cleaner 100.

Meanwhile, the compensation models 1100 and 1200 may be implemented in hardware, software or a combination of hardware and software. When some or all of the compensation models 1100 and 1200 are implemented in software, one or more commands configuring the compensation models 1100 and 1200 may be stored in the memory 170.

The environment or state used for learning of the compensation models 1100 and 1200 may be referred to as input parameters for training.

The input parameter for training may correspond to the cleaning environment information.

The compensation models 1100 and 1200 may output the suction output value and the driving speed as the result value using the input parameter for training.

FIG. 7 will be described again.

The processor 180 of the robot cleaner 100 controls the suction unit to perform suction with the determined suction output value and controls the driving unit 160 to drive the robot cleaner at the determined driving speed (S705).

The suction output value of the suction unit 191 may be a current value or a voltage value applied to a suction motor (not shown) provided in the suction unit 191.

The suction output value may indicate a degree of suction of dust.

The processor 180 may determine the driving current or driving voltage of the driving motor provided in the driving unit 140 corresponding to the determined driving speed of the robot cleaner 100.

According to the embodiment of the present invention, it is possible to efficiently perform cleaning according to the determined suction output value and driving speed in consideration of various cleaning environments.

Therefore, it is possible to obtain the excellent cleaning effects as compared to power consumption of the robot cleaner 100.

According to the embodiment of the present invention, since operation is adaptively controlled according to various cleaning environments, it is possible to efficiently perform cleaning.

According to the embodiment of the present invention, it is possible to obtain optimal cleaning effects with low power consumption.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc.

What is claimed is:

1. A robot cleaner for performing cleaning using artificial intelligence, the robot cleaner comprising:
    a suction unit configured to suction dust;
    a driving unit to drive the robot cleaner;
    a memory configured to store a compensation model for inferring optimal suction output and driving output for cleaning environment information for learning, and configured to store a look-up table that includes a correspondence relation between a type of a floor and a driving speed compared to a driving output so as to determine a type of a floor for cleaning environment information for learning; and a processor configured to:
acquire cleaning environment information,
acquire a suction output value and a driving speed as an output result of the compensation model which is learned using the cleaning environment information that includes at least one of a type of a floor, a space environment, cleanliness of the floor or a charge state of a battery provided at the robot cleaner as input parameters,
determine the suction output value and the driving speed of the robot cleaner from the acquired cleaning environment information using the compensation model,
control the suction unit to suction the dust with the determined suction output value,
control the driving unit to drive the robot cleaner at the determined driving speed,
perform cleaning, using the controlled suction unit and the controlled driving unit, with respect to a specific area,
measure a cleaning time and cleanliness of the floor after the robot cleaner performs cleaning with respect to the specific area,
provide a reward or a penalty to the compensation model based on the measured cleaning time and cleanliness, and
update the compensation model using feedback until a future reward reaches a maximum point.

2. The robot cleaner of claim 1, wherein the compensation model is an artificial neural network based model subjected to reinforcement learning through a deep learning algorithm or a machine learning algorithm, and
wherein the reinforcement learning is performed by a Markov Decision process.

3. The robot cleaner of claim 1, wherein the processor is configured to:
provide a reward to the compensation model when the measured cleaning time is less than a threshold time and the cleanliness is equal to or greater than a reference cleanliness, and
provide a penalty to the compensation model when the measured cleaning time is equal to or greater than the threshold time and the cleanliness is less than the reference cleanliness.

4. The robot cleaner of claim 1, wherein the processor is configured to:
provide a first reward to the compensation model when the measured cleaning time is less than a threshold time and the cleanliness is equal to or greater than a reference cleanliness,
provide a second reward, less than the first reward, to the compensation model when the measured cleaning time is equal to or greater than the threshold time and the cleanliness is equal to or greater than the reference cleanliness,
provide a first penalty to the compensation model when the measured cleaning time is less than the threshold time and the cleanliness is less than the reference cleanliness, and
provide a second penalty, greater than the first penalty, to the compensation model when the measured cleaning time is equal to or greater than the threshold time and the cleanliness is less than the reference cleanliness.

5. The robot cleaner of claim 1, wherein the processor is configured to:
apply current or voltage, based on the determined suction output value, to a suction motor provided at the suction unit, and
apply current or voltage, corresponding to the determined driving speed, to a driving motor provided at the driving unit.

6. The robot cleaner of claim 1, wherein the processor is configured to:
determine the type of the floor using an image recognition model subjected to supervised learning through a deep learning algorithm or a machine learning algorithm.

7. The robot cleaner of claim 6, further comprising a dust sensor,
wherein the processor is configured to measure the cleanliness of the floor based on a dust concentration determined by using the dust sensor.

8. The robot cleaner of claim 1, wherein the charge state of the battery provided at the robot cleaner is one of a charge amount of the battery or a discharge amount of the battery.

9. A method of operating a robot cleaner for performing cleaning using artificial intelligence, the method comprising:
acquiring cleaning environment information that includes at least one of a type of a floor, a space environment, cleanliness of the floor or a charge state of a battery provided at the robot cleaner as input parameters, wherein the type of the floor is acquired from a look-up table that includes a correspondence relation between a type of a floor and a driving speed compared to a driving output,
determining a suction output value and a driving speed of the robot cleaner from the acquired cleaning environment information using a compensation model for inferring optimal suction output and driving output,
controlling a suction unit of the robot cleaner to suction dust based on the determined suction output value,
controlling a driving unit of the robot cleaner to drive the robot cleaner based on the determined driving speed,
perform cleaning, using the controlled suction unit and the controlled driving unit, with respect to a specific area,
measuring a cleaning time and cleanliness of the floor at the specific area after the robot cleaner performs cleaning with respect to the specific area,
providing a reward or a penalty to the compensation model based on the measured cleaning time and cleanliness, and
update the compensation model using feedback until a future reward reaches a maximum point.

10. The method of claim 9, wherein the compensation model is an artificial neural network based model subjected to reinforcement learning through a deep learning algorithm or a machine learning algorithm, and
wherein the reinforcement learning is performed by a Markov Decision process.

11. The method of claim 9, wherein the providing of the reward or the penalty includes:
providing a reward to the compensation model when the measured cleaning time is less than a threshold time and the cleanliness is equal to or greater than a reference cleanliness, and
providing a penalty to the compensation model when the measured cleaning time is equal to or greater than the threshold time and the cleanliness is less than the reference cleanliness.

12. The method of claim 9, wherein the providing of the reward includes:
 providing a first reward to the compensation model when the measured cleaning time is less than a threshold time and the cleanliness is equal to or greater than a reference cleanliness, and
 providing a second reward, less than the first reward, to the compensation model when the measured cleaning time is equal to or greater than the threshold time and the cleanliness is equal to or greater than the reference cleanliness, and
wherein the giving providing of the penalty includes:
 providing a first penalty to the compensation model when the measured cleaning time is less than the threshold time and the cleanliness is less than the reference cleanliness, and
 providing a second penalty, greater than the first penalty, to the compensation model when the measured cleaning time is equal to or greater than the threshold time and the cleanliness is less than the reference cleanliness.

13. The method of claim 9, wherein the controlling of the suction unit includes applying current or voltage, based on the determined suction output value, to a suction motor provided at the suction unit, and
 wherein the controlling of the driving unit includes applying current or voltage, corresponding to the determined driving speed, to a driving motor provided at the driving unit.

14. The method of claim 9, wherein the type of the floor is determined using an image recognition model subjected to supervised learning through a deep learning algorithm or a machine learning algorithm.

15. The method of claim 9, wherein the cleanliness of the floor is measured based on a dust concentration determined by using a dust sensor.

16. The method of claim 9, wherein the charge state of the battery provided at the robot cleaner is one of a charge amount of the battery or a discharge amount of the battery.

\* \* \* \* \*